(12) United States Patent
Akahane et al.

(10) Patent No.: US 7,886,791 B2
(45) Date of Patent: *Feb. 15, 2011

(54) PNEUMATIC RADIAL TIRE FOR PASSENGER CAR

(75) Inventors: Hidenobu Akahane, Kodaira (JP); Hiroyuki Yokokura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 818 days.

This patent is subject to a terminal disclaimer.

(21) Appl. No.: 11/883,332

(22) PCT Filed: Jan. 20, 2006

(86) PCT No.: PCT/JP2006/300860

§ 371 (c)(1),
(2), (4) Date: Jul. 30, 2007

(87) PCT Pub. No.: WO2006/080253

PCT Pub. Date: Aug. 3, 2006

(65) Prior Publication Data

US 2008/0099118 A1 May 1, 2008

(30) Foreign Application Priority Data

Jan. 31, 2005 (JP) .............................. 2005-024054

(51) Int. Cl.
*B60C 9/04* (2006.01)
*B60C 9/00* (2006.01)
*D02G 3/48* (2006.01)

(52) U.S. Cl. ...................................... 152/556; 152/451

(58) Field of Classification Search .................. 152/451, 152/556; 428/394
See application file for complete search history.

(56) References Cited

U.S. PATENT DOCUMENTS

2008/0156409 A1* 7/2008 Yokokura et al.

FOREIGN PATENT DOCUMENTS

| JP | 2001295134 A | * | 10/2001 |
| JP | 2001-341504 A | | 12/2001 |
| JP | 2002-307908 A | | 10/2002 |
| JP | 2004-218189 A | | 8/2004 |
| JP | 2004-308024 A | | 11/2004 |
| JP | 2004306635 A | * | 11/2004 |

OTHER PUBLICATIONS

English machine translation of JP 2004-218189 A, Aug. 5, 2004.*

* cited by examiner

*Primary Examiner*—Adrienne C Johnstone
(74) *Attorney, Agent, or Firm*—Sughrue Mion, PLLC

(57) ABSTRACT

A pneumatic radial tire for a passenger car having a pair of bead portions and a carcass having at least one carcass ply toroidally extending between a pair of bead cores embedded in the respective bead portions and containing organic fiber cords. The organic fiber cord is a polyketone fiber cord satisfying the following equation: $\sigma \geq -0.01E+1.2$ and $\sigma \geq 0.02$, where $\sigma$ is a thermal shrinkage stress at 177° C. (cN/dtex) and E is an elastic modulus at 25° C. under a load of 49N (cN/dtex). The cord has a ply-twisting coefficient $N_1$ of 0.35-0.70 and a cable-twisting coefficient $N_2$ of 0.50-0.95, where $N_1 = n_1 \times (0.125 \times D_1/\rho)^{1/2} \times 10^{-3}$, $N_2 = n_2 \times (0.125 \times D_2/\rho)^{1/2} \times 10^{-3}$, $n_1$ is a ply twisting number (turns/10 cm), $n_2$ is a cable twisting number (turns/10 cm), $D_1$ is dtext of ply-twisted yarn, $D_2$ is a total dtex, and $\rho$ is a specific gravity of the cord (g/cm³).

5 Claims, 1 Drawing Sheet

PNEUMATIC RADIAL TIRE FOR PASSENGER CAR

TECHNICAL FIELD

This invention relates to a pneumatic radial tire for a passenger car, and more particularly to a pneumatic radial tire for a passenger car improving a high-speed durability and a steering stability by using organic fibers having excellent dynamic characteristics and high thermal shrinkage characteristics.

RELATED ART

In the carcass of the conventional pneumatic tire, an organic fiber cord such as rayon, nylon, polyester or the like is generally used as a reinforcing cord. However, since these organic fiber cords are low in the initial resistance to stretching, when these cords are used in the tire carcass, there is a fear that the cords are deformed due to the stretching during the use of the tire. Therefore, such a tire has a possibility of deteriorating the running performances and a problem that it is difficult to use under severer conditions such as super high speed running and the like.

As a cord being high in the initial resistance to stretching is known a cord made of polyketone fiber. When such a cord is applied to the carcass of the tire, the durability under a heavy load and the steering stability are improved well-balancedly (see JP-A-2000-190705 and JP-A-2002-307908). Also, there is recently conducted to develop polyketone fibers having a high thermal shrinkage stress (see HP-A-2004-218189).

Also, it is conducted to improve the organic fiber cords from a view point of the twisting structure. The organic fiber cord used for reinforcing a rubber member such as a carcass or the like in the tire is typically comprised of a strand twisted yarn obtained by ply-twisting fiber raw yarns to form a ply-twisted yarn and further cable-twisting a plurality of the ply-twisted yarns. At the present time, there is usually adopted such a balance twisting that the ply twist number in the ply twisting is equal to the cable twist number in the cable twisting.

The organic fiber cords are required to be high in the stiffness for the purpose of reinforcing the rubber member. On the contrary, in the organic fiber cord adopting the general-purpose balance twisting, the stiffness of the cord can be improved by decreasing the twisting number, but the fatigue resistance of the cord is deteriorated by the decrease of the twisting number, and hence there is a problem of deteriorating the durability of the cord.

On the other hand, there is adopted a method wherein an aromatic polyamide fiber having a high strength is used as a raw yarn in the cord having a high initial resistance to stretching and the poor resistance to compression fatigue being a drawback of the aromatic polyamide fiber is improved by changing a balance between the ply twisting and the cable twisting. Even in the cords produced by this method, however, there is still a room for improving the fatigue resistance (see JP-U-63-19581).

Nowadays, higher-performance tires are demanded, and also the need for the development of tires having more excellent high-speed durability and steering stability is enlarging.

DISCLOSURE OF THE INVENTION

It is an object of the invention to provide radial tires for passenger cars wherein the pushing-out and softening phenomenon of the tire due to the rise of the temperature during the high-speed running is suppressed to improve the steering stability in the high-speed running.

The inventors have made various studies in order to achieve the above object and found that the above problems can be solved by using polyketone fiber cords with a high thermal shrinkage stress at a high temperature and specified ranges of ply-twisting coefficient and cable-twisting coefficient in a carcass of a radial tire for a passenger car. The invention has been accomplished based on such a knowledge.

That is, the invention provides (1) A pneumatic radial tire for a passenger car comprising a pair of bead portions and a carcass comprised of at least one carcass ply toroidally extending between a pair of bead cores embedded in the respective bead portions and containing organic fiber cords, characterized in that the organic fiber cord constituting the carcass ply is a polyketone fiber cord satisfying the following equation (I):

$$\sigma \geq -0.01E + 1.2 \text{ and } \sigma \geq 0.02 \tag{I}$$

[wherein $\sigma$ is a thermal shrinkage stress at 177° C. (cN/dtex) and E is an elastic modulus at 25° C. under a load of 49N (cN/dtex)] and the polyketone fiber cord has a ply-twisting coefficient $N_1$ defined by the following equation (II) of 0.35-0.70 and a cable-twisting coefficient $N_2$ defined by the following equation (III) of 0.50-0.95:

$$N_1 = n_1 \times (0.125 \times D_1/\rho)^{1/2} \times 10^{-3} \tag{II}$$

$$N_2 = n_2 \times (0.125 \times D_2/\rho)^{1/2} \times 10^{-3} \tag{III}$$

[in the equations (II) and (III), $n_1$ is a ply twisting number (turns/10 cm), $n_2$ is a cable twisting number (turns/10 cm), $D_1$ is dtext of ply-twisted yarn, $D_2$ is a total dtex, and $\rho$ is a specific gravity of the polyketone cord (g/cm³)];

(2) A pneumatic radial tire according to item (1), wherein the polyketone fiber cord constituting the carcass ply has a thermal shrinkage stress at 100° C. of not more than 0.07 cN/dtex and a thermal shrinkage stress at 130° C. of not less than 0.40 cN/dtex;

(3) A pneumatic radial tire according to item (1) or (2), wherein the polyketone fiber cord constituting the carcass ply has substantially a repeating unit represented by the following general formula (IV):

(IV)

[wherein A is a moiety derived from an unsaturated compound polymerized with unsaturated bonds, and may be same or different in each of repeating units];

(4) A pneumatic radial tire for a passenger car according to item (3), wherein A in the formula (IV) is ethylene group; and (5) A pneumatic radial tire for a passenger car according to items (1)-(4), wherein the thermal shrinkage stress of the polyketone fiber cord constituting the carcass ply is repeatedly developed in a reversible fashion in correspondence with a tire temperature.

According to the invention, there can be provided radial tires for passenger cars wherein the pushing-out and softening phenomenon of the tire due to the rise of the temperature during the high-speed running is suppressed to improve the steering stability in the high-speed running.

BEST MODE FOR CARRYING OUT THE INVENTION

Figure 1:
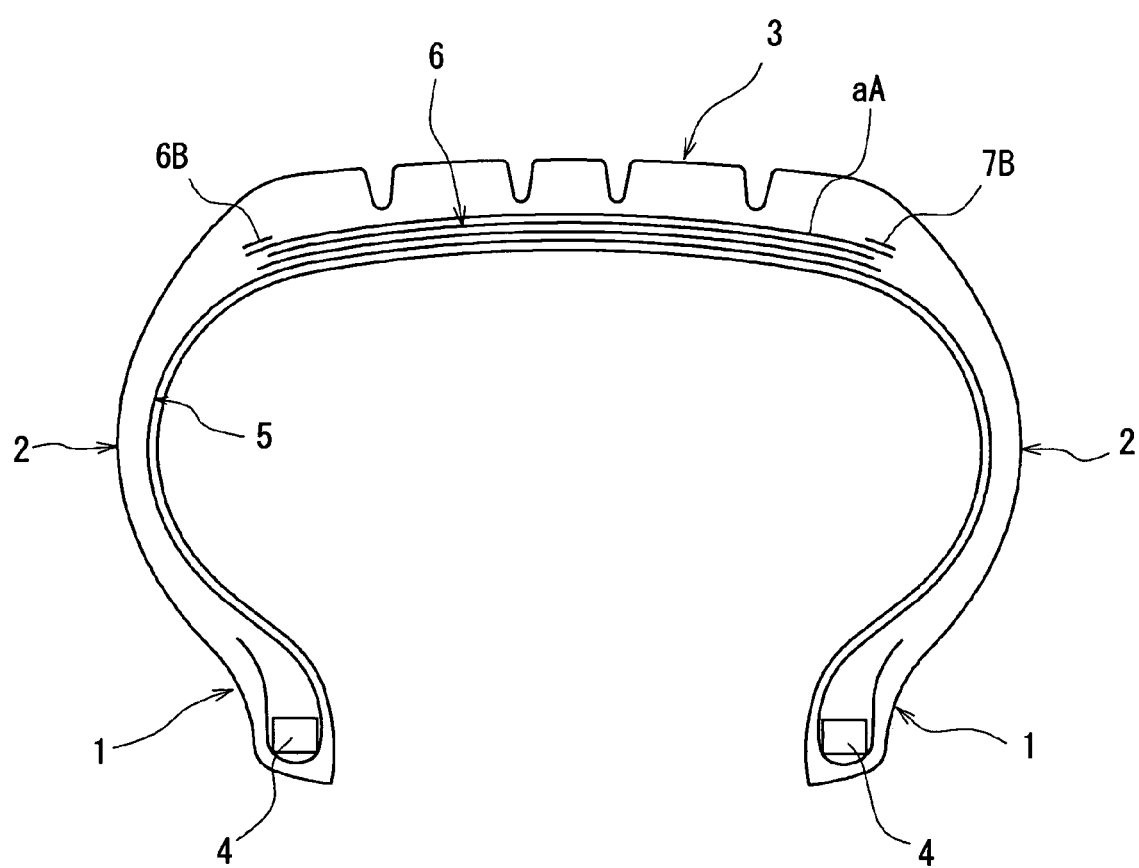
FIG. 1 is a section view of an embodiment of the pneumatic tire according to the invention.

In the radial tire for passenger car according to the invention, the organic fiber cord constituting the carcass ply is a polyketone fiber cord satisfying the following equation (I):

$$\sigma \geq -0.01E + 1.2 \text{ and } \sigma \geq 0.02 \quad (I)$$

[wherein $\sigma$ is a thermal shrinkage stress at 177° C. (cN/dtex) and E is an elastic modulus at 25° C. under a load of 49N (cN/dtex)], and the polyketone fiber cord is required to satisfy a ply-twisting coefficient $N_1$ defined by the following equation (II) of 0.35-0.70 and a cable-twisting coefficient $N_2$ defined by the following equation (III) of 0.50-0.95:

$$N_1 = n_1 \times (0.125 \times D_1/\rho)^{1/2} \times 10^{-3} \quad (II)$$

$$N_2 = n_2 \times (0.125 \times D_2/\rho)^{1/2} \times 10^{-3} \quad (III)$$

[in the equations (II) and (III), $n_1$ is a ply twisting number (turns/10 cm), $n_2$ is a cable twisting number (turns/10 cm), $D_1$ is dtext of ply-twisted yarn, $D_2$ is a total dtex, and $\rho$ is a specific gravity of the polyketone cord (g/cm$^3$)].

The thermal shrinkage stress $\sigma$ at 177° C. of the polyketone fiber cord used herein is a stress generated at 177° C. in the cord when a sample of the polyketone fiber cord having a fixed length of 25 cm and subjected to a usual dipping treatment prior to vulcanization is heated at a temperature rising rate of 5° C./minute, while the elastic modulus E at 25° C. under a load of 49 N of the polyketone fiber cord is an elastic modulus as a unit of cN/dtex calculated from a tangent line at 49 N in S-S curve by a tensile test of the cord according to JIS.

The polyketone fiber cord used in the invention has excellent dynamic characteristics such as high strength and high elastic modulus but also is high in the thermal shrinkage stress and the dry heat shrinkage and develops a strong shrinking property in heat.

As a polyketone being a raw material of the polyketone fiber cord used in the invention is preferable a polyketone substantially having a repeating unit represented by the formula (IV). Also, among the polyketones, a polyketone wherein not less than 97 mol % of the repeating unit is 1-oxotrimethylene [—CH$_2$—CH$_2$—CO—] is preferable, a polyketone wherein not less than 99 mol % is 1-oxotrimethylene is more preferable, and a polyketone wherein 100 mol % is 1-oxotrimethylene is most preferable.

In the polyketone as the raw material of the polyketone fiber cord, ketone groups may be partly bonded with each other or moieties derived from the unsaturated compound may be bonded with each other, but it is preferable that a ratio of alternate arrangement of the moiety derived from the unsaturated compound and the ketone group is not less than 90% by mass, more preferably not less than 97% by mass, most preferably 100% by mass.

The unsaturated compound forming A in the formula (IV) is most preferably ethylene, and may be an unsaturated hydrocarbon other than ethylene such as propylene, butene, pentene, cyclopentene, hexene, cyclohexene, heptene, octene, nonene, decene, dodecene, styrene, acetylene, allene or the like; a compound containing an unsaturated bond such as methyl acrylate, methyl metacrylate, vinyl acetate, acrylamide, hydroxyethyl metacrylate, undecenic acid, undecenol, 6-chlorohexene, N-vinylpyrolidone, diethylester of sulnylphosphonic acid, sodium styrenesulfonate, sodium allylsulfonate, vinylpyrolidone, vinyl chloride or the like; and so on.

As the polymerization degree of the polyketone, it is preferable that a limit viscosity ($\eta$) defined by the following formula:

$$[\eta] = \lim_{C \to 0} \frac{(T-t)}{(t \cdot C)}$$

[wherein t is a passing time of hexafluoroisopropanol having a purity of not less than 98% at 25° C. through a viscosity tube, and T is a passing time of a diluted solution of polyketone dissolved in hexafluoroisopropanol at 25° C. through the viscosity tube; and C is a mass (g) of a solute in 100 mL of the diluted solution] is within a range of 1 to 20 dL/g, more preferably 2 to 10 dL/g, even more preferably 3 to 8 dL/g. When the limit viscosity is within the above range, a high-strength polyketone fiber cord can be obtained, but also the occurrence of troubles such as napping, breaking and the like can be suppressed in the steps of spinning, drying and drawing. Further, the synthesis time of the polymer is controlled to a proper range, and the resulting polymer can be dissolved in a solvent, and hence polyketone fibers having excellent spinability, properties and productivity can be obtained.

As a method for forming polyketone fiber are preferable (1) a method comprising the steps of spinning an undrawn fiber and subjecting to a multi-stage heat drawing in which a final drawing at the multi-stage heat drawing step is carried out at specified temperature and draft ratio, and (2) a method comprising the steps of spinning an undrawn fiber, subjecting to heat drawing and then quenching under a high tension. By forming the polyketone fiber through the method (1) or (2), desirable filaments suitable for the production of the polyketone fiber cord can be obtained.

The method for spinning the undrawn polyketone fiber is not particularly limited, but may adopt the conventionally known methods. Concretely, there are mentioned a wet spinning method using an organic solvent such as hexafluoroisopropanol, m-cresol or the like as disclosed in JP-A-H02-112413, JP-A-H04-228613 and JP-A-H04-505344, and a wet spinning method using an aqueous solution of zinc salt, calcium salt, thiocyanate, iron salt or the like as disclosed in WO99/18143, WO00/09611, JP-A-2001-164422, JP-A-2004-218189 and JP-A-2004-285221.

For example, in the wet spinning method using the organic solvent, a polyketone polymer is dissolved in hexafluoroisopropanol, m-cresol or the like at a concentration of 0.25 to 20% by mass and extruded through a spinning nozzle to from a fiber and then the solvent is removed in a non-solvent bath of toluene, ethanol, isopropanol, n-hexane, isooctane, acetone, methyl ethyl ketone or the like, whereby the undrawn polyketone fiber can be obtained after the washing.

On the other hand, in the wet spinning method using the aqueous solution, the polyketone polymer is dissolved in an aqueous solution of zinc salt, calcium salt, thiocyanate, iron salt or the like at a concentration of 2 to 30% by mass and extruded from a spinning nozzle into a coagulation bath at 50 to 130° C. to conduct gel spinning and then desalted and dried to obtain the undrawn polyketone fiber. In the aqueous solution dissolving the polyketone polymer, it is preferable to use a mixture of a zinc halide and a halide of an alkali metal or an alkaline earth metal. In the coagulation bath can be used water, an aqueous solution of a metal salt, or an organic solvent such as acetone, methanol or the like.

As the method for drawing the undrawn fiber is preferable a heat drawing method wherein the undrawn fiber is drawn by heating to a temperature higher than the glass transition temperature of the undrawn fiber. Moreover, the drawing of the undrawn fiber in the above method (2) may be carried out at one stage, but it is preferable to conduct the multi-stage drawing.

The heat drawing method is not particularly limited, and may adopt a method of running the fiber on, for example, a heat roll or a heat plate, and so on. At this moment, the heat drawing temperature is preferably within a range of 110° C. to (a melting point of polyketone), and the total drawing ratio is preferably not less than 10 times.

When the formation of the polyketone fiber is carried out through the method (1), the temperature at the final drawing step of the multi-stage drawing is preferable to be within a range of 110° C. to (drawing temperature at drawing step just before the final drawing step—3° C.). When the formation of the polyketone fiber is carried out through the method (2), the tension applied to the fiber after the heat drawing is preferable to be within a range of 0.5 to 4 cN/dtex, and the cooling rate in the quenching is preferable to be not less than 30° C./second, and the cooling-end temperature in the quenching is preferable to be not higher than 50° C.

The quenching method of the heat-drawn polyketone fiber is not particularly limited, and may adopt the conventionally known methods. Concretely, the cooling method using the roll is preferable. Moreover, the thus obtained polyketone fiber is large in the retention of elastic strain, so that it is preferable that the fiber is usually subjected to a relaxation heat treatment so as to make the fiber length shorter than the fiber length after the heat drawing. At this moment, the temperature of the relaxation heat treatment is preferable to be within a range of 50 to 100° C. and the relaxation ratio is preferable to be within a range of 0.980 to 0.999.

Also, the polyketone fiber is preferable to have a crystal structure that the crystallinity is 50-90% and the crystal orientation is not less than 95%. When the crystallinity is less than 50%, the formation of the fiber structure is insufficient and the sufficient strength is not obtained but also there is a fear that the shrinking property and dimensional stability in heat become unstable. Therefore, the crystallinity is preferably 50-90%, more preferably 60-85%.

The polyketone fiber cord can be prepared by twisting filaments made of the polyketone. The filament bundle number to be twisted is not particularly limited, but it is preferable to be a strand twisted cord obtained by twisting two filament bundles each having a fineness of 500-300 dtex. For example, the above filament bundle is ply-twisted and then the two ply-twisted bundles are cable-twisted in an opposite direction, whereby a twisted cord can be obtained.

The polyketone fiber cords thus obtained are rubberized to obtain a cord/rubber composite used in the carcass ply. The coating rubber for the polyketone fiber cord is not particularly limited, and a coating rubber used in the conventional belt reinforcing layer can be used. Moreover, the polyketone fiber cord may be treated with an adhesive to improve adhesiveness with the coating rubber before the rubberization of the polyketone fiber cords.

The thermal shrinkage stress of the thus obtained polyketone fiber cord is about 4 times of the thermal shrinkage stress of nylon 6,6 and about 10 times of that of polyethylene terephthalate as the conventional fiber material. Therefore, it is possible to reduce the weight by largely decreasing the amount of the fibers used.

In order to most effectively utilize the high thermal shrinking characteristic of the polyketone fiber, it is desirable that the processing temperature and the temperature of the product in use are temperature near to a temperature indicating a maximum thermal shrinkage stress (hereinafter referred to as a maximum thermal shrinking temperature).

When it is used as a fiber material for rubber reinforcement such as tire cord, belt or the like, the maximum thermal shrinking temperature is desirable to be a range of 100-250° C., more preferably 150-240° C. because the processing temperature such as RFL treating temperature or vulcanization temperature is 100-250° C. and the temperature in the heat generation of the material such as tire or belt in the repetitive use or during the high-speed rotation is 100-200° C.

The polyketone fiber cord having high thermal shrinking characteristics as mentioned above is required to satisfy the condition of the equation (I) in the invention. Since the polyketone fiber cord is large in the thermal shrinkage stress at higher temperatures, as the tire temperature rises during the high-speed running, the sufficient thermal shrinkage stress is generated in the cord to develop the hoop effect, whereby the pushing out of the shoulder portion due to centrifugal force is suppressed. Therefore, when the polyketone fiber cord satisfying the equation (I) is applied to the carcass ply of the radial tire ofr passenger car, the excellent steering stability can be obtained in the high-speed running.

In the invention, $\sigma \geq -0.01E+1.2$ in the equation (I) is derived as follows. As a force suppressing a change of the tire shape at the high-speed running state are existent a drag F1 passively developed by the carcass ply against an input from exterior (for example, tension variation and strain) and a drag F2 actively developed by the carcass ply due to a heat generation. That is, a sum of F1 and F2 is required to be over a certain level in order to effectively suppress the change of the tire shape during the high-speed running. When contributing ratios of the F1 and F2 are respectively α and β (wherein α>0 and β>0), there is derived the following equation:

$$\alpha \times F1 + \beta \times F2 > \gamma$$

(wherein γ is a standard value based on a tire size or a velocity and γ>0). In this case, a mainly dominant factor of F1 includes a stiffness EC of the cord in the ply cord, while a mainly dominant factor of F2 includes a thermal shrinkage stress HF of the ply cord. By substituting EC as F1 and HF as F2 for the above equation is derived the following equation:

$$HF > -\alpha/\beta \times EC + \gamma/\beta$$

When the thermal shrinkage stress σ at 177° C. of the ply cord is used as HF and the elastic modulus E at 25° C. under a load of 49 N of the ply cord is used as EC, the thermal shrinkage stress σ is required to be in an upper domain of gradient $(-\alpha/\beta) \times$ elastic modulus E+intercept $(\gamma/\delta)$. The inventor has studied and discovered that when the gradient $(-\alpha/\beta)$ is $-0.01$ and the intercept $(\gamma/\beta)$ is 1.2, or when the thermal shrinkage stress σ and the elastic modulus E satisfy the relationship of $\sigma \geq -0.01E+1.2$, the change of the tire shape during the high-speed running can be effectively suppressed.

In the tire according to the invention, the polyketone fiber cord is preferable to have a thermal shrinkage stress σ at 177° C. of not more than 1.5 cN/dtex. When the thermal shrinkage stress σ at 177° C. of the polyketone fiber cord exceeds 1.5 cN/dtex, the shrinkage force during the vulcanization becomes excessively large, and as a result, the cord disorder and rubber disarray inside the tire are caused to bring about the deteriorations of the durability and uniformity. Also, the polyketone fiber cord more preferably has a thermal shrinkage stress σ at 177° C. of not more than 1.40 cN/dtex, more preferably not more than 1.00 cN/dtex in view of avoiding the change of the shape due to extremely shrinking in the high-speed running. Furthermore, the polyketone fiber cord preferably has a thermal shrinkage stress σ at 177° C. of not less than 0.10 cN/dtex, more preferably not less than 0.20 cN/dtex, even more preferably more than 0.4 cN/dtex in view of sufficiently suppressing the change of the shape during the high-speed running.

Moreover, the polyketone fiber cord preferably has an elastic modulus E at 25° C. under a load of 49 N of not less than 30 cN/dtex in view of preventing the large change of the shape due to the internal pressure, more preferably not less than 90 cN/dtex in view of providing the good shape stability. Furthermore, the polyketone fiber cord preferably has an elastic modulus E at 25° C. under a load of not more than 170 cN/dtex in view of sufficiently ensuring the fatigue resistance, more preferably an elastic modulus E of not more than 160 cN/dtex in view of providing the good fatigue resistance.

As another factor in the invention, it is required that the polyketone fiber cord is a two strand yarn obtained by ply-twisting fiber raw yarns of polyketone at a ply twisting coefficient $N_1$ defined by the equation (II) and cable-twisting a plurality of the ply-twisted yarns at a cable-twisting coefficient N2 defined by the equation (III) in a direction opposite to the ply twisting and the ply twisting coefficient $N_1$ defined by the equation (II) in the polyketone fiber cord is within a range of 0.35-0.70 and the cable twisting coefficient $N_2$ defined by the equation (III) is within a range of 0.50-0.95.

When the polyketone fiber cord having the ply twisting coefficient and cable twisting coefficient of the above defined ranges is used as the cord used in the invention, there can be obtained cords having excellent fatigue resistance, tensile stiffness and cord strength, and hence there can be obtained cords for the carcass ply highly balancing the cord strength and the fatigue resistance.

Furthermore, it is desirable that the polyketone fiber cord constituting the carcass ply in the invention has a thermal shrinkage stress at 100° C. of not more than 0.07 cN/dtex and a thermal shrinkage stress at 130° C. of not less than 0.40 cN/dtex. The lower limit of the thermal shrinkage stress at 100° C. is not particularly limited, and is usually about 0.01 cN/dtex. On the other hand, the upper limit of the thermal shrinkage stress at 130° C. is not particularly limited, and is usually about 0.6 cN/dtex.

In the invention, the thermal shrinkage stress of the polyketone fiber cord constituting the carcass ply is preferable to be repeatedly developed in a reversible fashion in correspondence with a tire temperature. In the polyketone fiber cord used in the invention, the thermal shrinkage stress violently increases over 110° C. As the tire temperature in the high-speed running rises, the thermal shrinkage stress increases, and hence the pushing-out of the shoulder in the high-speed running is suppressed to exhibit an excellent steering stability in the high-speed running. That is, the thermal shrinkage stress increases with the rise of the tire temperature. The shrinking of the polyketone fiber cord turns to the original state at room temperature and is again developed at a higher temperature. Such a phenomenon occurs in a reversible fashion and is repeated every the running of the tire. Moreover, the effects between the usual running and the high-speed running can be established by using the polyketone fiber cord in which the difference between thermal shrinkage stresses at 20° C. and 177° C. is not less than 0.20 cN/dtex, preferably not less than 0.25 cN/dtex.

In the pneumatic tire for passenger cars according to the invention, the polyketone fiber cord is used in the carcass of the tire. Since the polyketone fiber cord has highly balanced cord strength and fatigue resistance and a high thermal shrinkage stress, by using such a cord in the carcass of the tire can be enhanced the stiffness of the side portion of the tire and the steering stability at the high speed can be improved.

An embodiment of the tire according to the invention will be described with reference to the accompanying drawing below. FIG. 1 is a section view of an embodiment of the pneumatic tire for passenger car according to the invention. The tire shown in FIG. 1 comprises a pair of bead portions 1, a pair of side portions 2, a tread portion 3, a carcass 5 toroidally extending between bead cores 4 embedded in the respective bead portions 1, a belt 6 disposed on an outside of a crown portion of the carcass 5 in a radial direction of the tire and comprised of at least two belt layers, a belt reinforcing layer 7A disposed at an outside of the belt 6 in the radial direction of the tire so as to cover the whole of the belt 6, and a pair of belt reinforcing layers 7B disposed at an outside of the belt reinforcing layer 7A in the radial direction of the tire so as to cover both end portions of the belt 6. Although each of the illustrated belt reinforcing layers 7A and 7B is one layer, it may be two or more layers. Also, a tire omitting the belt reinforcing layer 7A and/or the belt reinforcing layer 7B is an example of the tire according to the invention. In the tire according to the invention, the aforementioned polyketone fiber cord is applied to the carcass 5.

EXAMPLES

The following examples are given in illustration of the invention and are not intended as limitations thereof.

There is prepared a pneumatic radial tire for passenger car (tire size: 195/65R15) by using ply cords of a material, structure and properties shown in Table 1 in a carcass ply.

(Stability in Actual Running at High Speed)

With respect to pneumatic radial tires for passenger cars in Examples 1-3 and Comparative Examples 1-2 are evaluated their performances. The test is carried out by running a vehicle on a test circuit course of 4 km to evaluate a straight-running stability, a cornering stability, a stiffness feeling and a handling performance as 4 item performances. Each test results is evaluated by a 10 point method, in which the larger the numerical value, the better the performance. The results are shown in Table 1.

TABLE 1

|  | Comparative Example 1 | Comparative Example 2 | Example 1 | Example 2 | Example 3 |
| --- | --- | --- | --- | --- | --- |
| Material of ply cord | polyester | rayon | polyketone *1 | polyketone *1 | polyketone *1 |
| Cord structure (dtex) | 1670/2 | 1670/2 | 1670/2 | 1670/2 | 1670/2 |
| Twisting number (ply twisting number × cable twisting number) | 39 × 39 | 38 × 38 | 47 × 47 | 39 × 39 | 53 × 53 |

TABLE 1-continued

|  | Comparative Example 1 | Comparative Example 2 | Example 1 | Example 2 | Example 3 |
|---|---|---|---|---|---|
| Thermal shrinkage stress σ at 177° C. (cN/dtex) | 0.01 | 0 | 0.60 | 0.51 | 057 |
| Elastic modulus E at 25° C. under load of 49N (cN/dtex) | 37 | 51 | 123 | 145 | 109 |
| [−0.01E+1.2] | 0.83 | 0.69 | −0.03 | −0.25 | 0.11 |
| Ply twisting coefficient $N_1$ | 0.48 | 0.47 | 0.58 | 0.48 | 0.66 |
| Cable twisting coefficient $N_2$ | 0.68 | 0.81 | 0.82 | 0.68 | 0.93 |
| $N_2/N_1$ | 1.42 | 1.72 | 1.41 | 1.42 | 1.41 |
| Steering stability in actual running at high speed |  |  |  |  |  |
| 1. Straight-running stability | 8 | 8 | 9 | 10 | 9 |
| 2. Cornering stability | 7 | 7 | 9 | 10 | 9 |
| 3. Stiffness feeling | 7 | 7 | 10 | 11 | 10 |
| 4. Handling performance | 7 | 7 | 9 | 10 | 9 |

*1: polyketone in which approximately 100% comprises a repeating unit represented by the formula (IV) and not less than 97% of the repeating unit is 1-oxotrimethylene.

As seen from Table 1, the tires of Examples 1-3 using the polyketone fiber cord satisfying the equations (I), (II) and (III) in the carcass ply are superior to the tires of the comparative examples in the four evaluation items (straight-running stability, cornering stability, stiffness feeling and handling performance) evaluating the stability in the actual running at high speed, and are particularly excellent in the stiffness feeling and further cornering stability and handling performances.

INDUSTRIAL APPLICABILITY

According to the invention, there can be provided radial tires for passenger car in which the pushing-out of the tire and softening phenomenon of the tire due to the rise of the temperature in the high speed running are suppressed to improve the steering stability in the high-speed running.

The invention claimed is:

1. A pneumatic radial tire for a passenger car comprising a pair of bead portions and a carcass comprised of at least one carcass ply toroidally extending between a pair of bead cores embedded in the respective bead portions and containing organic fiber cords, characterized in that the organic fiber cord constituting the carcass ply is a polyketone fiber cord satisfying the following equation I:

$$\sigma \geq -0.01E+1.2 \text{ and } \sigma \geq 0.02 \quad \text{I}$$

wherein σ is a thermal shrinkage stress at 177° C. cN/dtex and E is an elastic modulus at 25° C. under a load of 49N cN/dtex and the polyketone fiber cord has a ply-twisting coefficient $N_1$ defined by the following equation II of 0.35-0.70 and a cable-twisting coefficient $N_2$ defined by the following equation III of 0.50-0.95:

$$N_1 = n_1 \times (0.125 \times D_1/\rho)^{1/2} \times 10^{-3} \quad \text{II}$$

$$N_2 = n_2 \times (0.125 \times D_2/\rho)^{1/2} \times 10^{-3} \quad \text{III}$$

in the equations II and III, $n_1$ is a ply twisting number turns/10 cm, $n_2$ is a cable twisting number turns/10 cm, $D_1$ is dtext of ply-twisted yarn, $D_2$ is a total dtex, and ρ is a specific gravity of the polyketone cord g/cm³.

2. A pneumatic radial tire according to claim 1, wherein the polyketone fiber cord constituting the carcass ply has a thermal shrinkage stress at 100° C. of not more than 0.07 cN/dtex and a thermal shrinkage stress at 130° C. of not less than 0.40 cN/dtex.

3. A pneumatic radial tire according to claim 1, wherein the polyketone fiber cord constituting the carcass ply has substantially a repeating unit represented by the following general formula IV:

wherein A is a moiety derived from an unsaturated compound polymerized with unsaturated bonds, and may be same or different in each of repeating units.

4. A pneumatic radial tire for a passenger car according to claim 3, wherein A in the formula IV is ethylene group.

5. A pneumatic radial tire for a passenger car according to claim 1, wherein the thermal shrinkage stress of the polyketone fiber cord constituting the carcass ply is repeatedly developed in a reversible fashion in correspondence with a tire temperature.

* * * * *